United States Patent [19]

Hasegawa

[11] Patent Number: 5,045,930
[45] Date of Patent: Sep. 3, 1991

[54] OPTICAL SYSTEM FOR A THREE-TUBE PROJECTION TELEVISION SET

[75] Inventor: Shinichi Hasegawa, Tokyo, Japan

[73] Assignee: Pioneer Electronic Corporation, Tokyo, Japan

[21] Appl. No.: 396,569

[22] Filed: Aug. 21, 1989

[30] Foreign Application Priority Data

Oct. 26, 1988 [JP] Japan .................. 63-268307

[51] Int. Cl.⁵ .......................... H04N 9/31; G03B 3/00
[52] U.S. Cl. ..................................... 358/60; 353/101; 358/231
[58] Field of Search ............... 353/101; 358/60, 64, 358/231, 237

[56] References Cited

U.S. PATENT DOCUMENTS

| 4,606,628 | 8/1986 | Vance | 353/101 |
|---|---|---|---|
| 4,672,458 | 6/1987 | McKechnie | 358/237 |
| 4,730,211 | 3/1988 | Hasegawa | 358/231 |
| 4,777,532 | 10/1988 | Hasegawa | 358/60 |

FOREIGN PATENT DOCUMENTS 62-295590 12/1987 Japan .

Primary Examiner—James J. Groody
Assistant Examiner—Mark R. Powell
Attorney, Agent, or Firm—Finnegan, Henderson, Farabow, Garrett and Dunner

[57] ABSTRACT

A three-tube color projection television. The outside projection optics are arranged so that a single part can be produced for use in projection televisions of diverse screen size. An image surface correcting lens is at a fixed angle with respect to the face of a projecting tube. The fixed angle corresponds to the Scheimpflug angle of one screen size. A focusing lens is at an adjustable angle with respect to the image surface correcting lens, thereby allowing overall angle adjustment and use of the part in projection televisions of diverse screen size.

4 Claims, 4 Drawing Sheets

OPTICAL SYSTEM FOR A THREE-TUBE PROJECTION TELEVISION SET

BACKGROUND OF THE INVENTION

The present invention relates to a three-tube projection television set in which images from blue, green and red projection cathode-ray tubes are projected and converged by lenses onto a screen to form a color image.

Heretofore, the optical system of the latter type of projection television set has a configuration as shown in FIG. 6.

In the drawing, the reference numeral 10 designates aligned projection cathode-ray tubes. That is to say, a green projection cathode-ray tube 10G is disposed in the center, and a red projection cathode-ray tube 10R and a blue projection cathode-ray tube 10B are disposed to the left and right, respectively, of the green projection cathode-ray tube 10G. These tubes are the outside tubes, as opposed to tube 10G. Three lenses, 20G, 20R and 20B are disposed in front of the green, red and blue projection cathode-ray tubes 10G, 10R and 10B, respectively. Three couplers, 30G, 30R and 30B are provided, each including an image surface correction lens for correcting the curvature of the field caused by the corresponding lens 20. The couplers 30G, 30R and 30B are optically coupled with the front surfaces of the green, red and blue projection cathode-ray tubes 10G, 10R and 10B, respectively.

Images from the three-color projection cathode-ray tubes 10G, 10R and 10B are converged by the lenses 20G, 20R and 20B, respectively, so that a focused color image is projected onto a screen 40.

In the condition described, there is no problem caused by the center lens 20G, because the center lens is disposed with its optical axis 20Gs set at right angles to the screen 40. However, the left and right lenses 20R and 20B are disposed with their optical axes 20Rs and 20Bs inclined relative to the screen 40. Therefore, as shown in FIG. 5, the tube surfaces 10Ra and 10Ba (image surfaces) of the projection cathode-ray tubes 10R and 10B are respectively inclined by angle $\beta$ relative to the lens surfaces of the lenses 20R and 20B according to a so-called Scheimpflug rule so that an image is focused over the whole surface of the screen 40 in spite of the inclination of their optical axes. The inclination angle $\beta$ (hereinafter referred to as "shine-proof angle") between the lens surface and the tube surface is represented by the expression $$\frac{1}{m} \tan\theta' = \tan\beta$$

in which m represents the magnification of the lens 20, and $\theta'$ represents an angle between the lens surface of the lens 20 and the screen 40.

FIG. 4 is a view for explaining a coupler 30 coupled with the whole surface of the projection cathode-ray tube 10. The coupler 30 has a configuration in which a meniscus lens 30b, for correcting the curvature of the field, is mounted through a packing 30c onto the lens side surface of a coupler frame 30a having a cavity in the center thereof, and, on the other hand, a tube surface 10a of the projection cathode-ray tube 10 is closely attached through a packing 30d to the projection cathode-ray tube 10 side surface of the coupler frame 30a. The cavity between the meniscus lens 30b and the tube surface 10a is filled with a liquid solution or the like having the double function of optical coupling and cooling the tube surface 10a. Further, the coupler is disposed so that the optical axis of the meniscus lens 30b coincides with the optical axis of the lens 20.

In this type projection television set, the angle $\theta'$ between the axis in each of the left and right lenses and the axis of the center lens (the angle $\theta'$ between the lens surface and the screen) and the magnification m of the lens change corresponding to the variation in projection distance as the screen size (the number of inches) changes. Accordingly, the Scheimpflug angle $\beta$ is determined in accordance with the screen size.

Conventionally, therefore, various exclusive coupler frames corresponding to various screen sizes have been individually separately produced so that the angle ($\theta$ in FIG. 4) between a plane to which the meniscus lens is mounted and a plane to which the tube surface is closely attached changes depending on the screen size. In general, the aforementioned coupler frames are, however, produced by aluminum die-cast or the like. Accordingly, various molds must be prepared corresponding to various screen sizes of the projection television sets, so that there arises a problem in cost.

SUMMARY OF THE INVENTION

An object of the present invention is to make it possible to use a coupler frame that can be used in various projection television sets which have screen sizes differing from one another.

In accordance with the present invention, each of the outside optical system of a three tube projection system is arranged so that the angle between the tube surface of the projection cathode-ray tube and the optical axis of an image surface correction lens is fixed, and the angle between the tube surface and the optical axis of the focusing lens is set based on the angle between the optical axis of the image surface correction lens and the optical axis of the focusing lens, thereby making it possible to use a coupler frame with various projection television sets irrespective of screen size.

DETAILED DESCRIPTION OF THE PREFERRED EMBODIMENT

Figure 1:
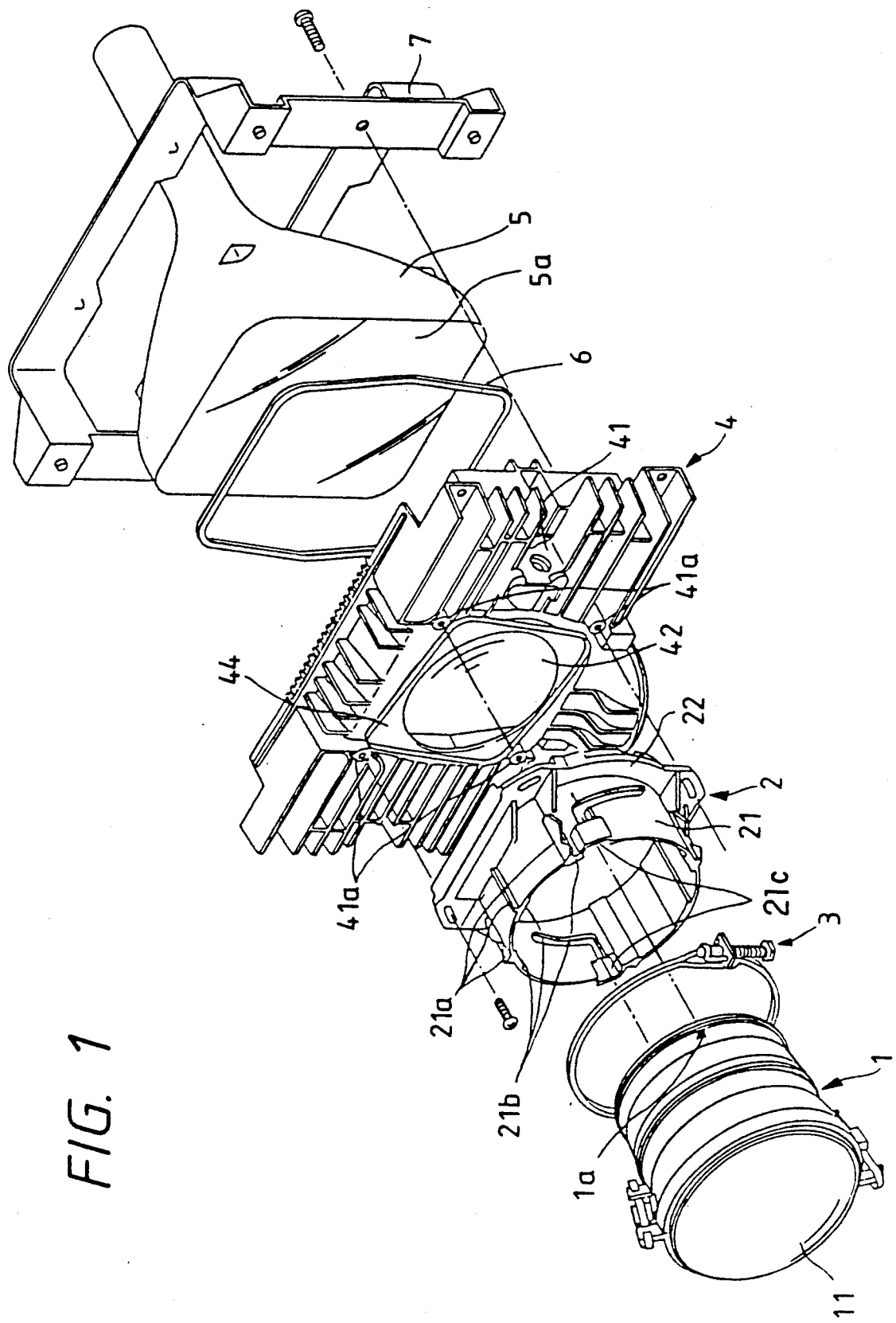
FIG. 1 is an exploded perspective view of a projector in a projection television set according to an embodiment of the present invention.
Figure 2:
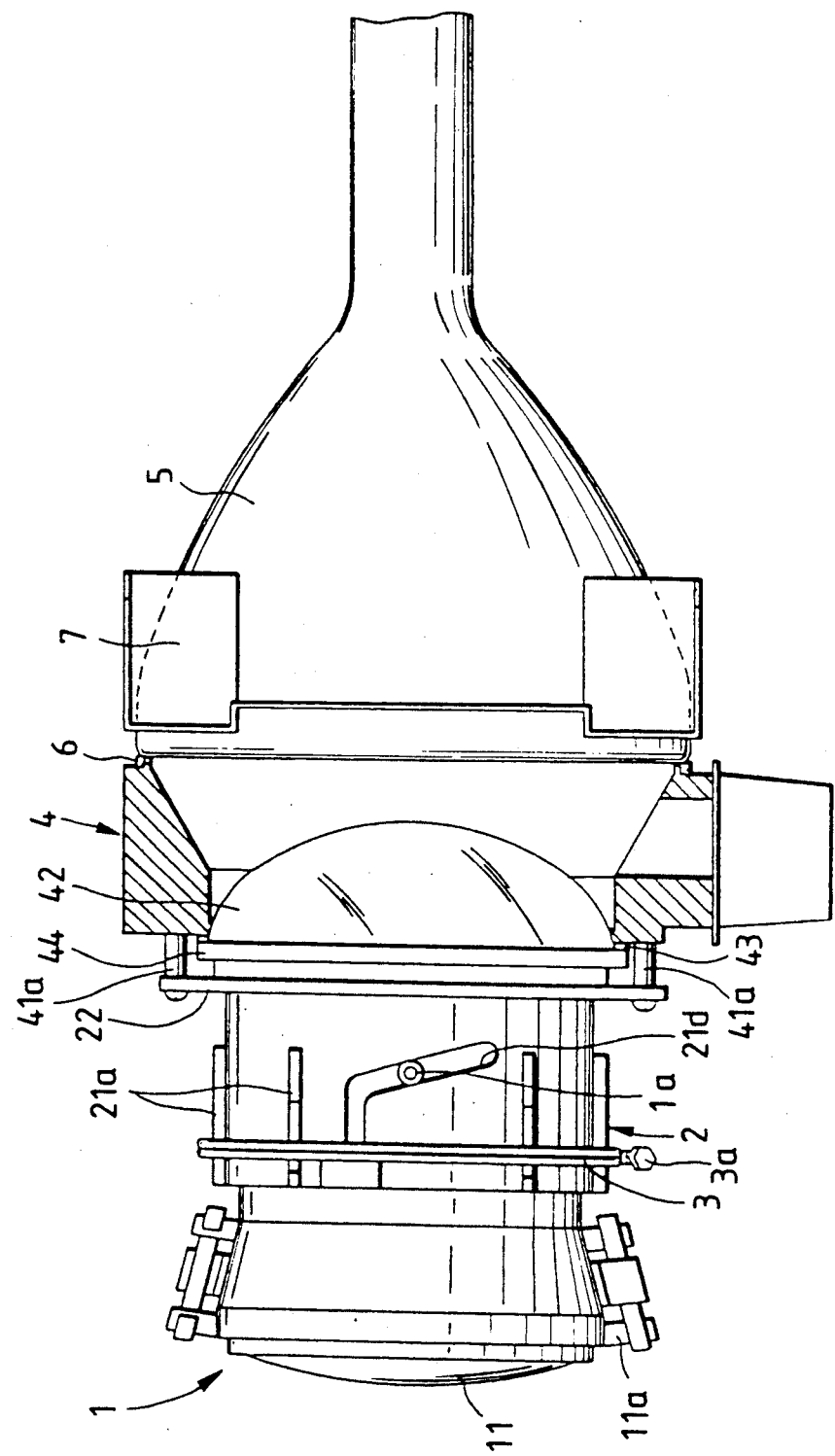
FIG. 2 is a sectional view of the projector depicted in FIG. 1 is an assembled condition.

Referring to FIGS. 1-3, the reference numeral 1 designates a lens barrel including a plurality of lenses 11 for correcting various aberrations and serving mainly to focus an image. A barrel supporting portion 2 has a cylinder portion 21 for inserting the lens barrel 1 therein and a flange 22, and a wire band for fixing the lens barrel 1 in the barrel support 2. The lens barrel 1 is inserted into the cylinder portion 21 and then fixed in the barrel supporting portion 2 by tightening the outer circumference of the cylinder portion 21 by means of the wire band 3.

The reference numeral 4 designates a coupler for cooling a tube surface 5a of a projection cathode-ray tube 5 and for optically coupling the lens barrel 1 and the projection cathode-ray tube 5 with each other. The projection cathode-ray tube 5 is mounted onto a coupler frame 41 through a packing 6 by use of a mount frame 7.

The mounting of the lens barrel 1 is carried out in a manner as follows.

The wire band 3 is put on the cylinder portion 21 provided with ribs 21a formed at six places on the outer circumference of the cylinder portion 21. Then, guide protrusions 1a formed on the side surface of the lens barrel 1 are passed through inlets 21c formed at two axially symmetrical places of the cylinder portion 21 and are fitted into oblique guide slots 21d in the side surface of the cylinder portion 21. The lens barrel 1 is rotated relative to the barrel supporting portion 2 to make the guide protrusions 1a slide on the side surfaces of the guide slots 21d, so that the distance between the lens barrel 1 and the tube surface 5a of the projection cathode-ray tube 5 is changed to perform focusing.

Protrusions 21b are formed in the inside of the ribs 21a in the cylinder portion 21, and the cylinder portion 21 is formed so as to be capable of being elastically transformed to some degree. When a fastening screw 3a of the wire band 3 is screwed in the fastening direction, the cylinder portion 21 is elastically transformed into a polygon to reduce the diameter of a circle inscribed by the protrusions 21b to thereby fix the lens barrel 1 to the barrel supporting portion 2. At this time each of the protrusions 21b moves by an equal distance toward the center, that is, the optical axis of the lens barrel 1, so that the optical axis of the lens barrel is made to coincide with the center axis of the cylinder portion 21.

The coupler 4 has a coupler frame 41 made of diecast aluminum. A meniscus lens 42 which serves mainly to correct the curvature of the field is fixed by means of a lens fixing frame 44 onto the coupler frame 41 at the barrel support side thereof through a packing 43. The projection cathode-ray tube 5 and the coupler frame 41 are fixed to each other by means of the mount frame 7 with the packing 6 disposed therebetween. A liquid which has the double function of optical coupling and cooling is enclosed between the meniscus lens 42 and the projection cathode-ray tube 5.

In the coupler frame 41, the angle (hereinafter referred to as "coupler inclination angle") between a plane to which the meniscus lens 42 is mounted and a plane to which the tube surface 5a of the projection cathode-ray tube 5 is closely attached is established to be a predetermined value as will be described later. The flange 22 is fastened by screws on four columnar fixing seats 41a formed around the meniscus lens 42 and in the coupler frame 41, so that the barrel supporting portion 2 is fixed.

Figure 3A:
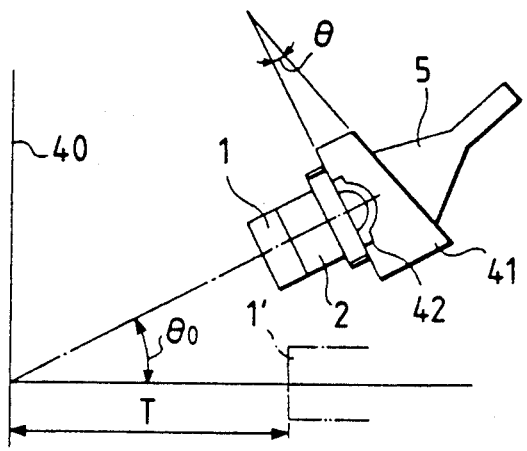
FIG. 3 illustrates diagrams for explaining examples of setting the projector of FIGS. 1 and 2.
Figure 3B:
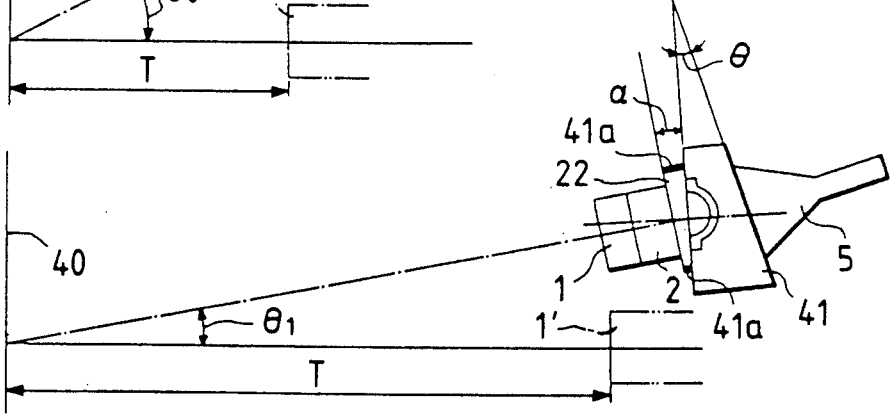
Figure 3C:
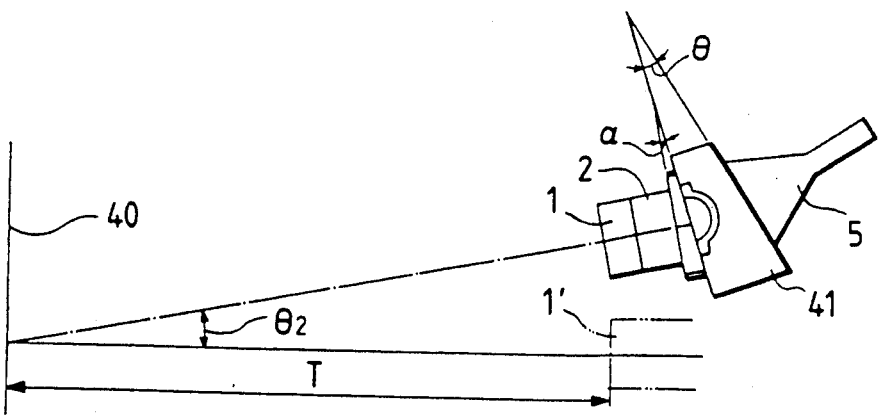
Figure 4:
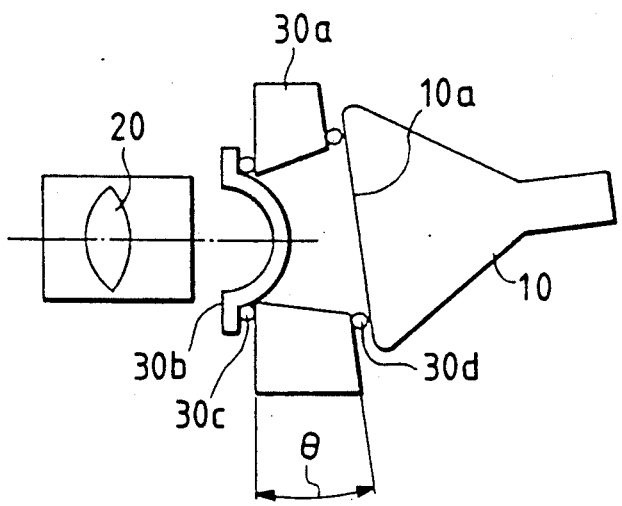
FIG. 4 is a view for explaining a coupler in a three-tube projection television set.
Figure 5:
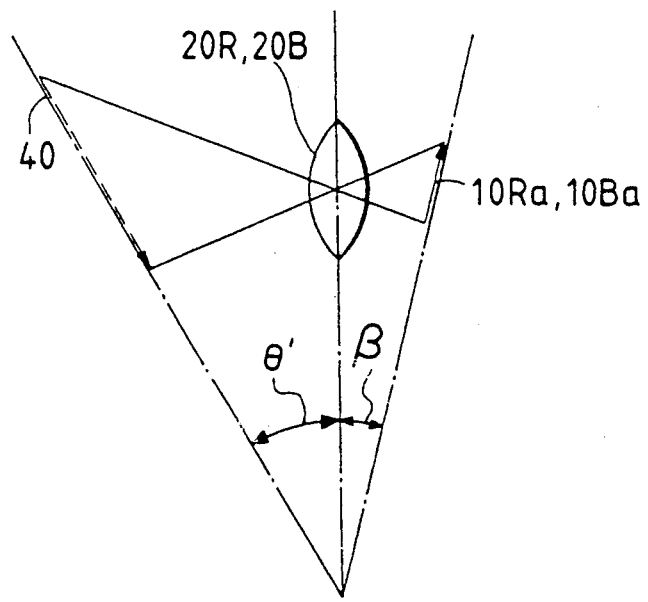
FIG. 5 is a view for explaining a shine-proof rule.
Figure 6:
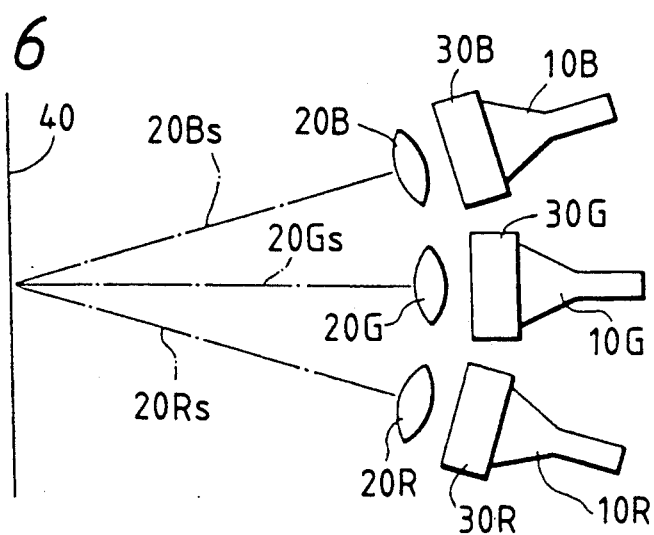
FIG. 6 is a view showing construction of the three-tube projection television set.

FIGS. 3 (a) through 3(c) are diagrams for explaining examples of mounting of the projector in this embodiment. Each diagram shows the optically positional relation with respect to one of the opposite-side projection cathode-ray tubes (i.e., the red or blue projection tubes typically). Each diagram shows the angles in exaggerated size for better understanding FIG. 3(a) shows the case of a projection television set having a standard screen size; FIG. 3(b) shows the case of a projection television set having a large screen size; and FIG. 3(c) shows the case of a projection television set having a small size In the drawings, the reference numeral 1' designates a lens barrel of a central projector.

In this embodiment, the coupler inclination angle $\theta$ of the coupler frame 41 relative to the projection tube face is established to be the Scheimpflug angle $\beta$ for projection television having a small size screen.

As shown in FIG. 3(a), the barrel supporting portion 2 for supporting the lens barrel 1 is fixed to the coupler frame 41 so as to make the optical axis of the lens barrel 1 coincide with the optical axis of the meniscus lens 42 so that an image from the projection cathode-ray tube 5 can be focused over the whole surface of the screen 40.

On the other hand, in the large screen size projection television as shown in FIG. 3(b), the same coupler frame 41 used in the small screen size projection television is used, but the coupler inclination angle $\theta$ does not coincide with the Scheimpflug angle for a large screen size projection television. Therefore, the barrel supporting portion 2 for supporting the lens barrel 1 is inclined so that the optical axis of the lens barrel 1 is divergent from the optical axis of the meniscus lens 42.

At this time, the inclination angle of the flange 22 of the barrel supporting portion 2, that is, the angle $\alpha$ (hereinafter referred to as "correction angle") between the lens surface of the lens barrel 1 and the lens surface of the meniscus lens 42 is established by adjusting, through cutting or the like, the length of the fixing seats 41a formed in the coupler frame 41.

In the embodiment, the coupler inclination angle $\theta$ is set on the basis of the small screen size projection television set. Therefore, the barrel supporting portion 2 in the large screen size projection television must be inclined toward the center of the three tubes relative to the optical axis of the meniscus lens 42. An opposite condition applies for the case of FIG. 3(c).

When the barrel supporting portion 2 is inclined as described above, the angle between the lens axis of the lens barrel and the tube surface of the projection cathode-ray tube is made to coincide substantially with the shine-proof angle even though the apparatus uses a coupler frame in which the coupler inclination angle $\theta$ does not coincide with the shine-proof angle. Accordingly, not only can an image from the projection cathode-ray tube be focused over the whole surface of the screen, but also a coupler of the same shape can be used in various projection television sets different from each other in screen size.

The following Table shows numerical data for projection television sets having the screen sizes of 40 inches, 45 inches and 50 inches, respectively, in the case where the coupler inclination angle $\theta$ is set on the basis of the screen size of 40 inches. In the Table, m represents the magnification of the lens, and T represents the projection distance (see FIGS. 3(a) through (c)).

| Screen size | 40 inches | 45 inches | 50 inches |
| --- | --- | --- | --- |
| m | 8.1 | 8.7 | 9.7 |
| T | 822 mm | 885 mm | 950 mm |
| $\beta$ | 1.2° | 1.14° | 0.85° |
| $\theta$ | 1.2° | 1.2° | 1.2° |
| $\alpha$ | 0° | 0.1° | 0.3° |
| $\theta'$ | 7.4° | 6.9° | 5.5° |

Although in the above embodiments the coupler inclination angle $\theta$ is set on the basis of the smallest screen size projection television, the invention is applicable to the case where the coupler inclination angle may be set on the basis of the large screen size projection television and where the angle between the lens barrel and the coupler may be corrected for the small screen size projection television. In this case, the lens barrel in the projection television with the size smaller than a standard must be inclined to the reverse direction with respect to the center of the three projection cathode-ray tubes.

Although the aforementioned embodiment has shown the case where the length of the fixing seats of the coupler frame is adjusted to incline the lens barrel, it is a matter of course that any other means may be employed so long as a structure to incline the lens barrel relative to the coupler can be provided. For example, a spacer or the like may be disposed in the fixing portion between the barrel supporting portion and the coupler.

As described above, according to the present invention, with respect to each of opposite-side projection cathode-ray tubes in a three-tube projection television set, an angle between a tube surface of a projection cathode-ray tube and an optical axis of an image surface correction lens is fixed, and an angle between the tube surface and an optical axis of a focusing lens is set on the basis of an angle between the optical axis of the image surface correction lens and the optical axis of the focusing lens. Accordingly, the same coupler frame can be used in various projection television sets which differ from each other in screen size, so that there is no necessity of producing various coupler frames that differ from each other in shape corresponding to various screen sizes of the projection television sets.

What is claimed is:

1. An optical system for optically projecting an image from a face of an outside projecting tube of a three-tube projection television, said system comprising:
   an image surface correcting lens;
   a focusing lens;
   first means for optically and mechanically coupling said image surface correcting lens to a face of said projecting tube, said first means positioning said correcting lens at an angle $\theta$ corresponding to the Scheimpflug angle for one size projecting screen; and
   second means for optically and mechanically coupling said focusing lens to said image surface correcting lens, said second means including an angle adjustment means for selectively changing the angle between said focusing lens and said image surface correcting lens to accommodate different sized projecting screens.

2. The system of claim 1, wherein said second means comprises a barrel supporting portion fixedly holding said focusing lens, said barrel supporting portion having an annular flange, said angle adjusting means including a plurality of fixing seats attached to said first means, said barrel being fixed to said fixing seats by screws extending through said flange and being seated in said fixing seats, said fixing seats being selectively alterable in length to vary the angle between said barrel supporting portion with said focusing lens and said first means with said image surface correction lens.

3. The system of claim 1, wherein the first means comprises a frame for supporting said image surface correcting lens.

4. An optical system for a three-tube projection television including a central and two outside optical tubes for projecting and converging separate color images from the three color projection tubes to a screen to form a single multicolor image, the system comprising:
   an image surface correcting lens mechanically and optically coupled to a face of each of the outside optical tubes, said image surface correcting lens being at a first fixed angle with respect to the corresponding tube face;
   a focusing lens mechanically and optically coupled to each of said image surface correcting lens, said focusing lens being at a second angle with respect to said image surface correcting lens, wherein the angle between the focusing lens and the tube face is the Scheimpflug angle for the screen size of the projection television; and
   angle adjustment means for selectively adjusting said second angle to permit the optical system to be used in a plurality of projection televisions having different screen sizes.

* * * * *